United States Patent [19]

Fujioka et al.

[11] Patent Number: 4,716,756

[45] Date of Patent: Jan. 5, 1988

[54] CLUTCH DRUM

[75] Inventors: Kazuyoshi Fujioka, Sagamihara; Toshiro Tani, Fujinomiya, both of Japan

[73] Assignees: Nissan Motor Co., Ltd., Yokohama; Yamakawa Industrial Co., Ltd., Fuji, both of Japan

[21] Appl. No.: 935,149

[22] Filed: Nov. 25, 1986

Related U.S. Application Data

[63] Continuation of Ser. No. 837,573, Mar. 4, 1986, abandoned, which is a continuation of Ser. No. 550,304, Nov. 10, 1983, abandoned.

[30] Foreign Application Priority Data

Nov. 11, 1982 [JP]  Japan ................................. 57-196777

[51] Int. Cl.[4] ............................................. B21K 21/16
[52] U.S. Cl. ......................................... 72/353; 72/399; 72/412
[58] Field of Search ............... 72/353, 355, 399, 402, 72/412

[56] References Cited

U.S. PATENT DOCUMENTS

| | | | |
|---|---|---|---|
| 4,089,097 | 5/1978 | Good et al. ........................ | 29/163.5 |
| 2,198,873 | 4/1940 | Hinsdale ............................. | 72/355 |
| 3,915,272 | 10/1975 | Maurice ............................. | 192/70.2 |
| 4,014,619 | 3/1977 | Good et al. ........................ | 192/70.2 |
| 4,043,173 | 8/1977 | Marciniak et al. .................. | 72/402 |
| 4,178,790 | 12/1979 | Buckley et al. ..................... | 72/402 |
| 4,470,290 | 9/1984 | Jungesjo ............................ | 72/402 |

FOREIGN PATENT DOCUMENTS

| | | |
|---|---|---|
| 2116649 | 7/1972 | France . |
| 2292894 | 6/1976 | France . |
| 47531 | 3/1982 | Japan .................................. 72/412 |

OTHER PUBLICATIONS

European Search Report.

*Primary Examiner*—Lowell A. Larson
*Attorney, Agent, or Firm*—Schwartz, Jeffery, Schwaab, Mack, Blumenthal & Evans

[57] ABSTRACT

A press-formed clutch drum of an automatic transmission of which inner and outer cylindrical surfaces are respectively formed with a first series of splines and a second series of inverted splines. The first and second series of splines are alternatively arranged in a ring so that each adjacent two splines are spaced by an interposal of a connecting portion defined therebetween. Each of the first and second series of splines comprises a pair of raised portions projected radially from the major cylindrical body of the drum, and a depressed portion interposed between the paired raised portions to form a groove in the major cylindrical body. The raised portions of the first and second series of splines are respectively projected inwardly and outwardly with respect to the center axis of the cylindrical body. The connecting portion extends between one of the paired raised portions of the first series of splines and adjacent one of the paired raised portions of the second series of splines and has a radial cross section which is inclined with respect to an imaginary plane which contains both the center axis of the major cylindrical body and the middle portion of the connecting portion in cross-section.

1 Claim, 8 Drawing Figures

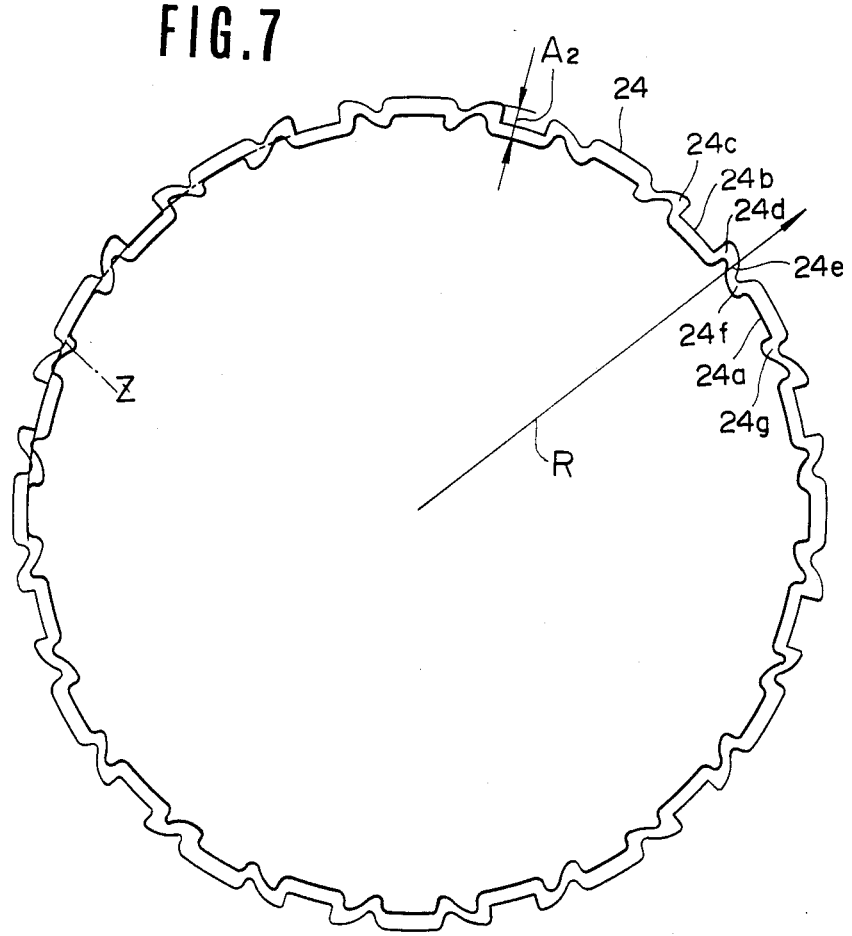

CLUTCH DRUM

This application is a continuation of application Ser. No. 837,573, filed Mar. 4, 1986, now abandoned, which was a continuation of Ser. No. 550,304, filed Nov. 10, 1983, now abandoned.

BACKGROUND OF THE INVENTION

1. Field of the Invention

The present invention relates in general to a clutch drum used in an automatic transmission and a method of producing same, and more particularly to a clutch drum having thereon press-formed splines and a method of producing same.

2. Description of the Prior Art

In the field of automatic transmissions using therein wet type multi plate clutches, there is known a type which comprises a clutch drum of which inner and outer cylindrical surfaces are both formed with splines or axially extending grooves. Upon assembly, the inside splines of the drum are mated with the external teeth of inner clutch plates disposed in the drum, while, the outside splines of the drum are mated with the internal teeth of outer clutch plates disposed about the drum. The outer clutch plates secure the clutch drum to a suitable fixed member when fixed. Usually, the outside and inside splines of the clutch drum of the type mentioned above are formed by employing a press-forming technique. However, due to their inherencies, some of the conventional press-forming techniques fail to provide the splines with adequate engaging surfaces which are to be actually engaged with the teeth of the clutch plates. This will be described in detail hereinafter for clarification of the invention.

SUMMARY OF THE INVENTION

In accordance with the present invention, there is provided a press-formed clutch drum, of an automatic transmission, of which inner and outer cylindrical surfaces are respectively formed with a first series of splines and a second series of inverted splines, the first and second series of splines being alternately arranged in ring so that each adjacent two splines are spaced by an interposal of a connecting portion defined therebetween, each of the first and second series of splines comprising a pair of raised portions projected radially from the major cylindrical body of the drum, and a depressed portion interposed between the paired raised portions to form a groove in the major cylindrical body, the raised portions of the first and second series of splines being respectively projected inwardly and outwardly with respect to the center axis of the cylindrical body, the connecting portion extending between the one of the paired raised portions of the first series of splines and adjacent one of the paired raised portions of the second series of splines and having a radial cross section which is inclined with respect to an imaginary plane which contains both the center axis of the major cylindrical body and the middle portion of the connecting portion in cross section.

According to the present invention, there is further provided a method of producing a clutch drum of an automatic transmission, which comprises: forming the inner and outer cylindrical surfaces of a cylindrical hollow body with axially extending grooves by employing a rear side extruding forming technique, the technique being a technique in which upon pressing, a part of the material of the body flows in a direction opposite to the direction in which a projection-formed die moves.

BRIEF DESCRIPTION OF THE DRAWINGS

Objects and advantages of the present invention will become apparent from the following description when taken in conjunction with the accompanying drawings, in which:

FIGS. 3 and 4 are drawings showing the method of producing the clutch drum according to the present invention, in which FIG. 3 shows a condition before pressing and FIG. 4 shows a condition after pressing;

FIG. 5 is a partial sectional view of a press-formed cylindrical body prior to forming thereon the splines;

FIG. 6 is a partical sectional view the press-formed cylindrical body after forming thereon the splines;

FIG. 7 is a sectional view of the clutch drum according to the present invention.

DETAILED DESCRIPTION OF THE PRESENT INVENTION

Figure 1:
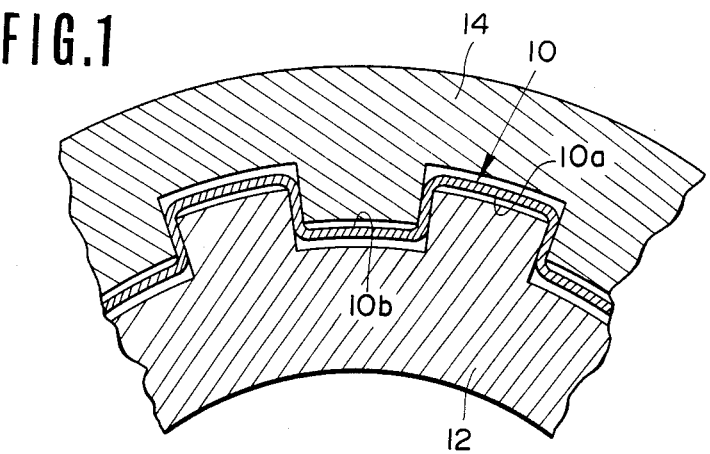
FIG. 1 is partial and sectional view of a clutch drum mated with inner and outer clutch plates, the clutch drum being shown constructed of an inpractically thin metal plate.
Figure 2:
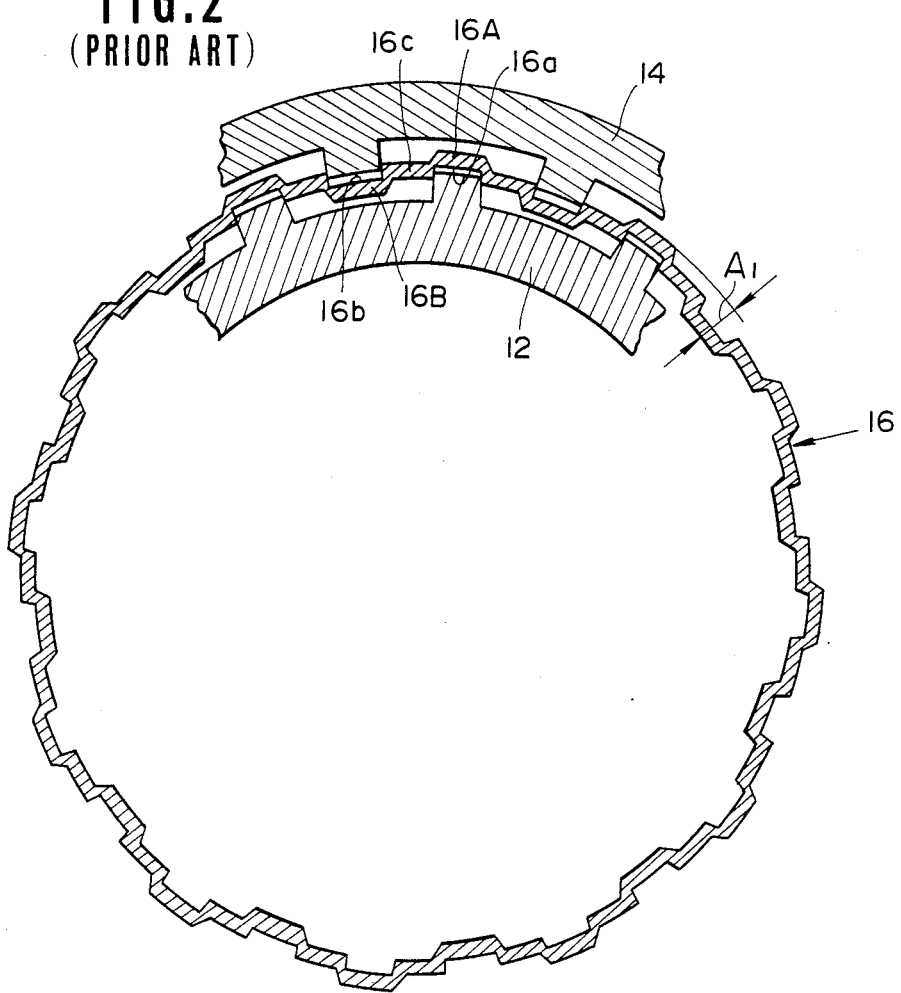
FIG. 2 is a sectional view of a conventional press-formed clutch drum mated with inner and outer clutch plates which are partially shown.

Prior to describing the invention, the field of the press-formed clutch drums of automatic transmission will be outlined with reference to FIGS. 1 and 2 in order to clarify the invention.

In order to produce a clutch drum of which inner and outer cylindrical surfaces are both formed with splines or axially extending grooves, usual forming technique needs substantially two pressing works at the same time, one being a work to press a cylindrical hollow body from outside to form the outside splines, and the other being a work to press the same from inside to form the inside splines. In this connection, if the clutch drum 10 is constructed of a very thin metal plate, it can have such a form as shown in FIG. 1. The clutch drum 10 in this form can have considerably deep splines 10a and 10b at the inner and outer cylindrical surfaces thereof, so that each spline on the clutch drum 10 can provide thereon an adequately wide engaging surface which is to be actually engaged with the teeth of the inner and outer clutch plates 12 and 14. Furthermore, this form of the clutch drum 10 can reduce the thickness of the splined cylindrical wall of the drum. However, as is known in the art, in practice, the clutch drum 10 can not be constructed of such a very thin metal plate because in operation it is applied with a great stress.

One of the conventionally and practically used clutch drums is shown in FIG. 2, as being designated by numeral 16. The clutch drum 16 is produced by employing a so-called "front side extruding forming" which will be described hereinafter. The clutch drum 16 has alternately arranged inside and outside splines 16a and 16b thereon with an interposal of base portions 16c between adjacent inside and outside splines 16a and 16b. However, this clutch drum 16 has the following drawbacks due to its inherent construction. That is, the provision of the raised portions 16A and 16B (behind which the inside and outside splines 16a and 16b are formed) projected outward and inward from the base portions 16c increases the thickness of the splined cylindrical wall of the clutch drum 16. Furthermore, since each spline 16a or 16b formed behind the corresponding raised portion 16A or 16B is inevitably rounded considerably at the bottom edges thereof, each spline fails to have sufficiently wide engaging surfaces which are to be actually engaged with the teeth of the clutch plates 12 or 14. When, for widening the engaging surfaces, the clutch drum is press-formed to have deeper splines by employing the front side extruding forming, it tends to have crucks.

In order to solve the above-mentioned drawback, the present invention is provided which is described in detail hereinnext. For easy with which the explanation is made, the following description will be commenced with respect to the method of producing the clutch drum.

Figure 3:
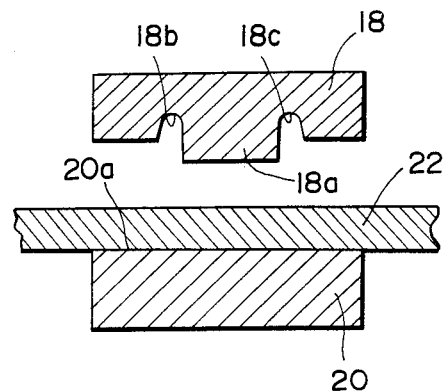
Figure 4:
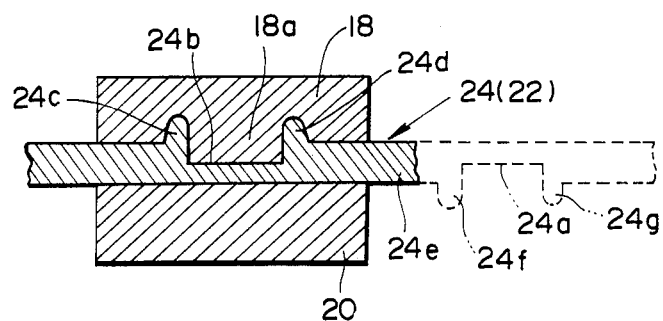

Referring to FIGS. 3 and 4, a pair of dies 18 and 20 are shown before and after pressing. In accordance with the present invention, these dies are arranged in ring in the press, so that each pair is inverted with respect to the preceding pair, viz., the circularly arranged die pairs take the form of a first series of dies alternately arranged with a second series of identical but inversely arranged ones. Since all of the paired dies act in substantially the same manner, the following description will be directed to only the illustrated dies 18 and 20 for facilitation.

Figure 8:
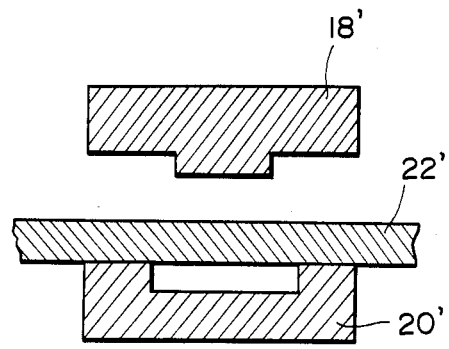
FIG. 8 is a view similar to FIG. 3, but showing a conventional method for producing a press-formed clutch drum.

First, a generally cylindrical hollow body 22 (see FIG. 5) formed by pressing a circular metal plate is prepared. The cylindrical body 22 is applied at its inside and outside cylindrical surfaces with press lubricant oil and then put in the press. The dies 18 and 20 (and of course the other dies not shown) of the press are designed to carry out a so-called "rear side extruding forming". For this forming, one of the dies (that is the lower die 20 in the drawings) has a substantially flat surface 20a, while, the other die (that is the upper die 18) has a projection 18a leaving at its root sides two grooves 18b and 18c. As is seen from FIG. 4, upon pressing, a part of the body 22 which is directly pressed by the projection 18a of the upper die 18 is moved back into the grooves 18b and 18c of the upper die and fill the same with the material of the body 22. It is thus to be noted that the "rear side extruding forming" is a method in which upon pressing, a part of the material of the pressed body flows in a direction opposite to the direction in which the projection-formed die 18 moves. It is known that this method minimizes the possibility of producing crucks in a metal plate which is pressed. (For reference, the before-mentioned conventional press-forming is shown in FIG. 8, which is a so-called "front side extruding forming". In this conventional forming, the part of the pressed body flows in the same direction as that in which the projection-formed die moves.)

With the pressing as mentioned hereinabove, the cylindrical hollow body 22 shown in FIG. 5 can be shaped to have the configuration as shown in FIGS. 6 and 7. It is to be noted that in FIG. 6, the portion indicated by the dotted circle X is shaped by the die pair of FIG. 3, while, the portion indicated by the dotted circle Y is shaped by the inverted die pair. The clutch drum 24 comprises a first series of splines 24a and a second series of inverted splines 24b arranged alternately around the drum. The first and second series of splines include a pair of raised portions 24f, 24g and 24c, 24d, respectively. Interposed between each pair of the raised portions 24c, 24d and 24f, 24g is a depressed portion 24h, 24i in the form of a groove in the major cylindrical body. The raised portions 24f, 24g of the first series of splines project radially inwardly with respect to the center axis of the cylindrical body, while the raised portions 24c, 24d of the second series of splines project radially outwardly with respect to the same axis. The raised portions include inside surfaces 30 which extend generally in a radial manner.

The adjacent splines are connected to one another by an interposal of a connecting portion 24e. The connecting portion extends, for example, from the raised portion 24d of a first spline in a curved and inclined manner with respect to the imaginary plane R to the raised portion 24f of the adjacent inverted spline. The inclined and curved nature of the connecting portion 24e produces grooves 25 between the connecting portion and the outer sidewalls 26 of the splines. The raised portions have a greater thickness than the connecting portions.

The clutch drum 24 thus produced has the following desirable feature which the conventional clutch drum 16 of FIG. 2 fails to have. That is, as is understood from FIG. 7, the spline 24b formed by the die pair 18 and 20 and the other spline 24a formed by the inverted die pair can have respective bottoms which are generally positioned on an imaginary common circle Z which is defined in and coaxial with the major cylindrical body of the drum 24. This induces that the adequately deep or wide engaging surface of the spline is provided by only the projections 24c and 24d formed on the body. In other words, in the clutch drum 24 of the invention, there is no portion corresponding to the base portion 16c of the conventional clutch drum 16 of FIG. 2. It is thus to be noted that the thickness A2 (see FIG. 7) of the splined cylindrical wall of the drum 24 of the invention can be reduced by about the degree corresponding the thickness of the base portion 16c.

Furthermore, in practical pressing, the longitudinally extending connecting portion 24e (see FIG. 7) defined between the spline 24b and the inverted spline 24a is shaped inclined with respect to an imaginary plane R which contains the center axis of the major cylindrical body of the drum and a part of the connecting portion 24e, causing the projections 24d and 24f to be also inclined. That is, by the pressing, the connecting portion 24e comes to have a radial cross section which is inclined with respect to an imaginary plane (R) which contains both the center axis of the major cylindrical body and the middle portion of the connecting portion in cross section. This inclination induces reduction in thickness of the clutch drum 24 without affecting or reducing the engaging surface provided by the spline. In fact, in the clutch drum 24 according to the present invention, the outward and inward projections 24c, 24d, 24f and 24g can have substantially equal heights to those of the outer and inner surfaces of the major cylindrical body of the drum 24, respectively.

What is claimed is:

1. A method of producing a clutch drum of an automatic transmission, said method comprising the steps of:
   a. placing a cylindrical hollow body between a plurality of die pairs, each of said die pairs comprising a first die member having a substantially flat die surface, and a second die member having a projection extending from a die surface of said second die member and grooves formed in said die surface of said second die member at the root of said projection, said plurality of die pairs being arranged in a ring such that said first and second die members of each die pair are inverted with respect to an adjacent die pair;

b. pressing said first and second die members of said plurality of die pairs together, such that material from said cylindrical hollow body flows into said grooves of said die surface of said second die member in a direction opposite to the direction in which said projection is moved, thereby forming a first and second series of splines respectively projecting inwardly and outwardly from inner and outer surfaces of said cylindrical hollow body to provide an engaging surface for said clutch drum; and c. releasing said first and second die members of said plurality of die pairs so that said cylindrical hollow body may be removed.

* * * * *